US010768941B2

(12) United States Patent
Mallichan et al.

(10) Patent No.: US 10,768,941 B2
(45) Date of Patent: Sep. 8, 2020

(54) OPERATING SYSTEM MANAGEMENT

(71) Applicant: HEWLETT-PACKARD DEVELOPMENT COMPANY, L.P., Houston, TX (US)

(72) Inventors: Kate Mallichan, Bristol (GB); Boris Balacheff, Boulogne-Billancourt (FR); Vali Ali, Houston, TX (US); Shane Steiger, Roseville, CA (US); Logan Clay Browne, Roseville, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 15/563,981

(22) PCT Filed: Jun. 26, 2015

(86) PCT No.: PCT/US2015/037903
§ 371 (c)(1),
(2) Date: Oct. 3, 2017

(87) PCT Pub. No.: WO2016/209250
PCT Pub. Date: Dec. 29, 2016

(65) Prior Publication Data
US 2018/0136940 A1 May 17, 2018

(51) Int. Cl.
G06F 9/4401 (2018.01)
G06F 21/57 (2013.01)
(Continued)

(52) U.S. Cl.
CPC .............. G06F 9/4406 (2013.01); G06F 8/61 (2013.01); G06F 9/441 (2013.01);
(Continued)

(58) Field of Classification Search
CPC .......... G06F 9/4406; G06F 8/61; G06F 9/441; G06F 9/45558; G06F 11/1469;
(Continued)

(56) References Cited

U.S. PATENT DOCUMENTS 8,443,365 B2 *  5/2013  Kumar ................ G06F 9/45558
                                                            714/1
2008/0092145 A1  4/2008  Sun et al.
(Continued)

FOREIGN PATENT DOCUMENTS

CN  103136052   6/2013
CN  103391374   11/2013
CN  104468611   3/2015

OTHER PUBLICATIONS

Kharif, O.; "Dual-identity Phones Helping Separate Work-home Lives"; Jan. 10, 2013; 7 pages.

Primary Examiner — Shin-Hon (Eric) Chen
Assistant Examiner — Jessica J South
(74) Attorney, Agent, or Firm — HPI Patent Department

(57) ABSTRACT

A computing device includes a processor, a memory coupled to the processor, and a non-transitory computer readable storage medium coupled to the processor that includes instructions, that when executed by the processor, cause the processor to manage a transition between a first operating system and a second operating system. The instructions cause the processor to instantiate a copy-on-write virtual computing system executing a first operating system, delete a second operating system from the non-transitory computer readable storage medium or the memory, copy the first operating system to the non-transitory computer readable storage medium. The instructions can further cause the processor to instantiate the first operating system on the computing device.

15 Claims, 5 Drawing Sheets

(51) Int. Cl.
  *G06F 9/455* (2018.01)
  *G06F 8/61* (2018.01)
  *G06F 21/74* (2013.01)
  *G06F 11/14* (2006.01)

(52) U.S. Cl.
  CPC ...... *G06F 9/45558* (2013.01); *G06F 11/1469* (2013.01); *G06F 21/57* (2013.01); *G06F 21/74* (2013.01); *G06F 2009/45562* (2013.01); *G06F 2009/45583* (2013.01); *G06F 2201/84* (2013.01); *G06F 2221/034* (2013.01)

(58) Field of Classification Search
  CPC .................. G06F 21/57; G06F 21/74; G06F 2009/45562; G06F 2009/45583; G06F 2201/84; G06F 2221/034

See application file for complete search history.

(56) References Cited

U.S. PATENT DOCUMENTS

| | | |
|---|---|---|
| 2010/0306774 A1 | 12/2010 | Kalbarga |
| 2011/0107331 A1 | 5/2011 | Evans et al. |
| 2011/0265183 A1 | 10/2011 | Wu et al. |
| 2012/0246641 A1 | 9/2012 | Gehrmann |
| 2013/0132690 A1* | 5/2013 | Epstein ............... G06F 12/1416 |
| | | 711/159 |
| 2013/0191924 A1* | 7/2013 | Tedesco ................ G06F 21/00 |
| | | 726/26 |
| 2013/0326110 A1 | 12/2013 | Tsirkin et al. |
| 2014/0053245 A1 | 2/2014 | Tosa et al. |
| 2014/0235222 A1 | 8/2014 | Gonen et al. |
| 2014/0365910 A1 | 12/2014 | Laadan et al. |
| 2015/0082305 A1 | 3/2015 | Hepkin et al. |
| 2015/0089497 A1 | 3/2015 | Borzycki et al. |
| 2015/0309829 A1* | 10/2015 | Hiltgen ................ G06F 21/57 |
| | | 718/1 |
| 2016/0103739 A1* | 4/2016 | Huang ............... G06F 11/1451 |
| | | 714/19 |
| 2016/0125059 A1* | 5/2016 | Jain ......................... G06F 16/13 |
| | | 707/639 |
| 2016/0212012 A1* | 7/2016 | Young ................ G06F 9/45558 |

* cited by examiner

OPERATING SYSTEM MANAGEMENT

BACKGROUND

Mobile computing devices afford users a large degree of freedom. With advances in wireless network capabilities, mobile computing devices, such as laptop computers, tablet computers, smartphones, and the like, provide users the ability to work and play on their device while at work, at home, or travelling. When used in a trusted physical or network environment, such as a trusted corporate campus with a secure network domain, site and network administrators may implement stringent policies and protocols to protect the mobile computing device and other devices and information on the network. However, when the mobile computing device is used in an unknown or untrusted domain, such as on a public street or connected to an unsecured public wireless network, it is difficult to anticipate every possible threat. The computing device can be stolen or lost or subject to network based attacks.

DETAILED DESCRIPTION

The present disclosure describes techniques for systems, methods, and devices for managing operating systems or data resident on a computing device for use in various trusted and untrusted domains. Various implementations include the ability to switch from an existing operating system to another operating system with little to no interruption to a user's operating experience. A hypervisor on the computing device can manage an instance of a virtual computing device executing a target or alternate operating system. While the virtual computing system is running, the user can continue to use the computing device with the functionality of the alternate operating system. In the background, the hypervisor can generate a backup image of the existing operating system, store it to a local or remote backup device, and then delete the all data associated with the existing operating system from the computing device. The hypervisor can install a local copy of the alternate operating system on the computing device. When the installation is complete, the hypervisor can transition the operation of the computing device from the virtual computing device by booting from the installed version of the alternate operating system and merging any changes made by the virtual version of the alternate operating system. The process can then be repeated to restore the computing device back to a previously installed operating from the backup device.

Figure 1:
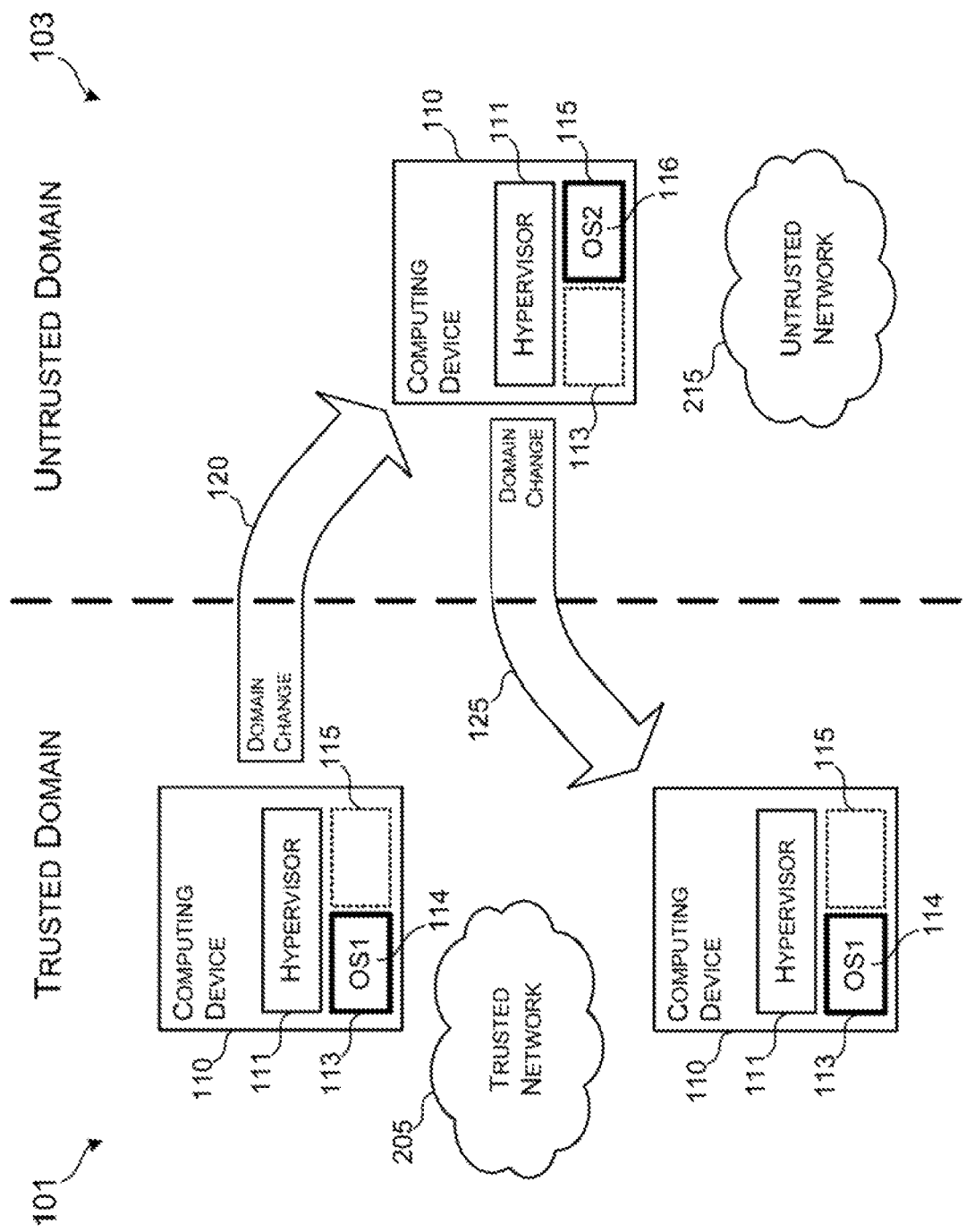
FIG. 1 depicts example management of operating systems corresponding to changes in domains.

FIG. 1 depicts an example computing device 110 with functionality to manage (e.g., install, delete, and execute) operating systems based on the domain or environment in which it will be used. Computing device 110 can be implemented as any type a computing device. For example, computing device 110 can be a mobile computing devices, such as a laptop computer, a tablet computer, a smart phone, a smartwatch, a wearable computer, and the like. The computing device 110 can include a processor and a memory device coupled to the processor and capable of operating in different locations or connecting to different networks. For instance, computing device 110 can move from a trusted domain 101 to an unknown domain 103 according to domain change 120. Similarly, the computing device 110 can return from the unknown domain 103 back to the trusted domain 101 according to domain change 125.

As described herein, domain changes 120 and 125 can represent changes in operating conditions that can include a changes of physical and/or network locations. For example, domain change 120 can represent a scenario in which a user physically removes computing device 110, such as a laptop computer, from a trusted domain 101 (e.g., a corporate office location, government building, research facility, etc.) equipped with restricted access doors, guards, gates, and other heightened physical security measures to and untrusted domain 103 (e.g., a privately owned vehicle, a private home, a shopping center, a public transportation system, etc.). Such untrusted domains 103 can have relatively limited or insufficient security measures to protect the computing device 110. The computing device 110, and any potentially sensitive or confidential information stored thereon, may be at risk of theft or loss while in an untrusted domain 103.

Domain change 120 can also represent a scenario that includes a change in network connections or other communication operating conditions. For example, domain change 120 can include a user disconnecting computing device 110 from a trusted network 205 (e.g., secure corporate network) and subsequently reconnecting it to a less secure network or untrusted network 215 (e.g., a public wireless network in a library, airport, or café, or user's private home network) with less stringent security than the secure trusted network 205. Such a change in communication operating conditions can include a change of network location (e.g., change in internet protocol (IP) address or associated wireless network) that occurs with or without a change in physical location. For instance, the computing device 110 can switch to a new wireless network, be moved from a location with access to a private network, or stop using a secure virtual private network (VPN). The change in communication operating conditions can be associated with changes in the level of network security.

For instance, an untrusted network 215 (e.g., a public or home network) may have minimal or outdated security, encryption, firewalls, and data sharing restrictions protocols. The reduced security of such an untrusted domain can expose vulnerabilities that make the computing devices 110, and the data stored thereon, susceptible to potential network-based attacks or intrusion from hackers, viruses, or malware. In addition, any attacks or intrusions on the computing device 110 while used in the untrusted domain 103 that put the computing device 110 at risk, can also compromise the security of secure network to network based attacks. Any information gleaned from a compromised computing device 110, such as passwords, encryption keys, security protocols, or malware that infiltrates the system while the computing devices 110 is used in the untrusted domain 103, can subsequently be used to breach security measures when the computing device 110 is returned to the trusted domain 101.

To mitigate or completely avoid the threats to the computing device 110, the trusted domain 101, and/or the trusted network 205 that stem from computing device 110 being used in an untrusted domain 103 or on an untrusted network 215, implementations of the present disclosure can change the operating system or data resident on the computing device 110. Such implementations can tailor the operating parameters, network configuration settings, security, and data resident on the computing device 110 according to the needs of the user or policy requirements for operating in a particular domain associated with the user or the computing device 110.

For example, while the computing device 110 is in the trusted domain 101 or connected to the trusted network 205, it can execute an operating system having full functionality for accessing other computing systems and data in the trusted domain. Such operating systems can include encryption protocols, encryption keys, stored usernames and passwords, network addresses, and the like. In addition, while in the trusted domain 101, the computing device 110 can also be permitted to obtain and save locals copies of any data or documents stored on a local memory device of the computing device 110. For instance, an employee may be allowed to create local copies of confidential documents or email stored on their company issued laptop computer.

However, during, or in anticipation of, a domain change 120 from the trusted domain 101 to the untrusted domain 103, implementations of the present disclosure can change the operating parameters of and the data on the computing device 110. In some implementations, the change to the operating parameters and data can be specific to the anticipated operating conditions or threat level of the untrusted domain 103. In various example implementations, the changes to the operating parameters and data are referred to specifically as changes in operating systems and associated data.

For example, if a user specifies that the computing device 110 is to make a domain change 120 from a trusted corporate network environment to the user's home wireless network, the computing device 110 can install a completely new operating system and restrict the type of data that can remain on the computing device 110. Such an operating system may include functionality for connecting to the corporate network using VPN and security protocols for regulating the data that is permitted to remain on the computing device 110. The operating system to be installed may be associated with a data classification permitted to be resident on the computing device 110 while it is in the same geographic area of the corporate location (e.g., in the same metropolitan area, province, state, etc.). In similar implementations, if a user indicates a trip to a location with highly suspect physical and network security (e.g., flown to another country or connected to a competitor's internal network), then the computing device 110 can install an operating system with enhanced security protocols and more severely restrict the type of data to remain in memory to avert potential information leaks.

Customization of the operating parameters (e.g. operating systems and associated security measures, networking capabilities, encryption functionality, etc.) and data installed on the computing device 110 can be based on the credentials of a user (e.g., security clearance, job function, prior security practices, etc.) associated with computing device 110. As described herein, the particular set of operating parameters and data installed or maintained on the computing device 110 can also be based on the anticipated characteristics or conditions of the untrusted domain 103 in which the computing device 110 will be used. Such customization can also be based on general security policies applicable to all users in a particular group, organization, or entity or based on the identity or job functions of individual users. To illustrate various aspects of the present disclosure, several specific example implementations are described in reference to the figures below.

As shown in FIG. 1, example computing device 110 can include a processor (not shown) and one or more memory devices 113 and 115. In some implementations, the memory devices 113 and 115 can include one or more partitions on a non-transitory computer readable storage medium. Additionally, the memory devices 113 and 115 can comprise a physical hard drive, a solid-state drive (SSD), or any other combination of volatile or nonvolatile computer readable media. Accordingly, the computing device 110 can include multiple memory devices that can be isolated from one another.

In some implementations, memory device 113 can be implemented as a particular partition on a hard drive or SSD, while memory device 115 can be implemented as another partition on the same hard drive or SSD. In some implementations, one partition can be a hidden or inactive partition, and another partition can be an active partition. As such, one operating system (e.g., OS1 114) and set of data may be installed as computer executable/readable code on memory device 113 (e.g., the active partition), while another operating system (e.g., OS2 116) and set of data can be installed as computer executable/readable code on memory device 115 (e.g., the hidden partition). As such, alternate OS2 116 can be copied from the hidden partition to the active partition when transitioning from OS1 114 to OS2 116.

The functionality of the computing device 110 described herein can be implemented as any combination of hardware and executable code or using an application specific integrated circuit (ASIC). For example, the functionality of computing device 110 described herein can be implemented as executable code that includes instructions that when executed by a processor cause the processor to perform various operations of the computing device 110.

As described. OS1 114 and its associated data on memory device 113 can be isolated from OS2 116 and its associated data on memory device 115 when executed or accessed by the processor of the computing device 110. Thus, when the computing device 110 is in the trusted domain 101, it can execute OS1 114 and access its associated data stored on memory device 113. Then, when the computing device is moved to or is anticipated to move to the untrusted domain 103 (e.g., before, during, or after domain change 120), the computing device 110 can delete OS1 114 and execute a separate and isolated OS2 116 from memory device 115 and access its associated set of data. The computing device 110 can then return to the trusted domain 101 (e.g. domain change 125), and reinstall the original OS1 114 and its associated data set can be reinstalled from a backup image. In some implementations, when returning to the trusted domain 101, the computing device 110 can delete OS2 116 and its associated data from the memory device 115.

The deletion of the OS2 116 can protect the computing device 110 and others computing systems in the trusted domain 101 from potential attacks from any malware that may have infiltrated the computing device 110 while in the untrusted domain 103. In related implementations, any user level data (e.g., documents, email, applications, etc.) generated by the user of the computing device 110 while in the untrusted domain 103 can either be deleted entirely or quarantined and scanned for potential threats before being reinstalled on the computing device 110.

In implementations of the present disclosure, switching between OS1 114 and OS2 116 can be a seamless operation with little to no interruption to the user. Such implementations include an instance of a hypervisor 111 executed on the computing device 110. The functionality of the hypervisor 111 can be implemented as any combination of hardware, computer executable code, and/or application-specific integrated circuits (ASIC). In one example, hypervisor 111 can include functionality to manage one or more virtual computing systems executing corresponding operating systems. The hypervisor 111 and any virtual computing systems it manages can be instantiated using the processor and memory in the computing device 110.

In one implementation, the hypervisor 111 can manage a transition that changes the operation of computing device 110 from one operating system (e.g., OS1 114 for use in the trusted domain 101) to another operating system (e.g., OS2 116 for use in the untrusted domain 103). The transition from one operating system to another can be triggered by an indication to the hypervisor 111 that the computing device will move from one domain to another (e.g., to/from trusted domain 101 from/to untrusted domain 103). In some implementations, the trigger can be generated locally in response to user input. In other implementation, the trigger can be generated remotely in response to user input received by a remote computer system (e.g., a server computer on which a user interface website is hosted).

Figure 2:
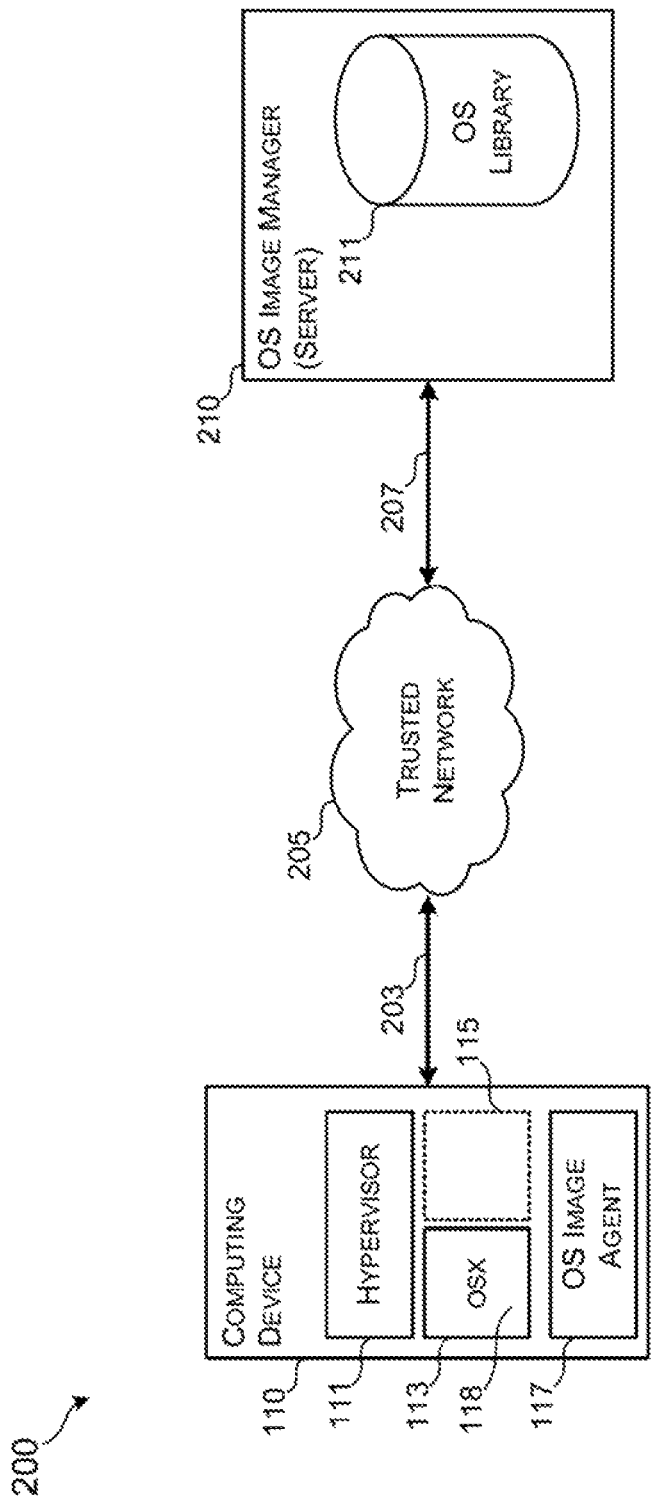
FIG. 2 illustrates an example system for management of domain-specific operating systems.

FIG. 2 depicts an example system 200 for managing transitions between operating systems. System 200 can include computing device 110 in communication with operating system image manager 210. The operating system image manager 210 can include functionality for managing and/or storing the various operating systems (OSx 118) that can be installed on the computing device 110. In one example, the hypervisor 111 instantiated on the computing device 110 can receive instructions and data from the operating system image manager 210 via the trusted network 205 and the corresponding network connections 203 and 207. For example, operating system image manager 210 can send a trigger signal to the computing device 110 to initiate and manage a transition from one operating system to another operating system.

In some implementations, the trigger signal can include an indication of or data corresponding to a particular operating system to which the operation of the computing device 110 should be transitioned. For example, the trigger signal can include an image of a particular operating system that the computing device 110 can use while operating in the untrusted domain 103. Similarly, the trigger signal can include a backup image of an original operating system with which the computing system 110 can resume normal operations when returning to the trusted domain 101.

Data that includes executable code and/or machine-readable information corresponding to operating systems usable by the computing device 110 can be stored and/or managed in the operating system image manager 210. For example, the operating system image manager 210 can include an operating system library 211 for storing backup images of an operating system OSx 118 for a particular computing device 110. The operating system library 211 can also store images of operating systems that the computing device 110 can use when operating in specific domains. In such implementations, each of the images of operating systems can be associated with specific use scenarios. For example, the images of the operating system stored in the operating system library 211 can be associated with specific classifications or identifiers of users, domains, security levels, job functions, computing device type, projects, cooperation agreements, contracts, and the like. Accordingly, an operating system to be installed on the computing device 110 can be based on classifications or identifiers associated with a specific use scenario.

For example, an operating system image stored in the operating system library 211 can be associated with a scenario that includes a high ranking corporate executive taking a laptop computer on a business trip into a foreign country to visit the facility of a potential business partner. Such an operating system may include enhanced security protocols that restricts or prohibits the laptop computer's access to company documents classified as sensitive or confidential as well as rejecting all incoming network communication to prevent network-based attacks. While such operating system may have utility while traveling, the enhanced security protocols may be excessive or impede productivity while the executive is working within the trusted domain 101 of the corporate network. Accordingly, when the laptop computer returns to the corporate network environments, the operating system image manager 210 can send a trigger command for the computing device to restore an OSx 118 intended for use within the trusted domain 101 and to delete the operating system and/or document level data generated by the user while traveling.

In response to the trigger signal, the hypervisor 111 and/or the operating system image agent 117 can perform independent or interrelated operations. For example the hypervisor 111 and/or operating system image agent 117 can create a backup image of the existing operating system currently operating the computing device 110, send the backup image to the operating system image manager 210, instantiate a virtual machine executing a new operating system based on an image received from the operating system image manager 210, delete the existing operating system, and transition the operation of the computing device 110 to the new operating system. Various aspects of the transition between an existing operating system to a new operating system and the restoration back to the existing operating system are described in detail in reference to specific example implementations illustrated in FIGS. 3 and 4. While operating system image agent 117 is depicted as an independent functionality box in FIG. 2, in various implementations, the functionality of operating system image agent 117 described herein can be included in an operating system, such as OSX 118, or hypervisor 111 instantiated on the computing device 110.

In various implementations, the computing device 110 can include communication and/or networking capabilities to communicate with the operating system image manager 210 using trusted network 205. In such implementations, the computing device 110 can be connected to the trusted network 205 by a corresponding network connection 203. Network connection 203 can include any wired or wireless network communication protocol and/or medium. Similarly, the operating system image manager 210 can be connected to the trusted network by corresponding network connection 207. Like network connection 203, network connection 207 can include any wired or wireless network communication protocol and/or medium. Accordingly, network connections 203 and 207 and trusted network 205 can implement various security and encryption protocols to secure and protect the communication signals exchange between the computing device 110 and the operating system image manager 210.

While the example illustrated in FIG. 2 depicts computing device 110 the operating system manager 210 communicating through trusted network 205, other example implementations of the present disclosure can include communication through an untrusted network 215. To secure the communication between the computing device 110 in the operating system image manager 210, various endpoint type security protocols can be used, such as, virtual private networks, public a key infrastructure, encryption key protocols, and the like. Accordingly, the computing device 110 and the operating system manager 210 can include functionality for securely communicating with one another through a trusted network 205 and/or untrusted networks 215 via corresponding network connections 203 and 207.

Figure 3:
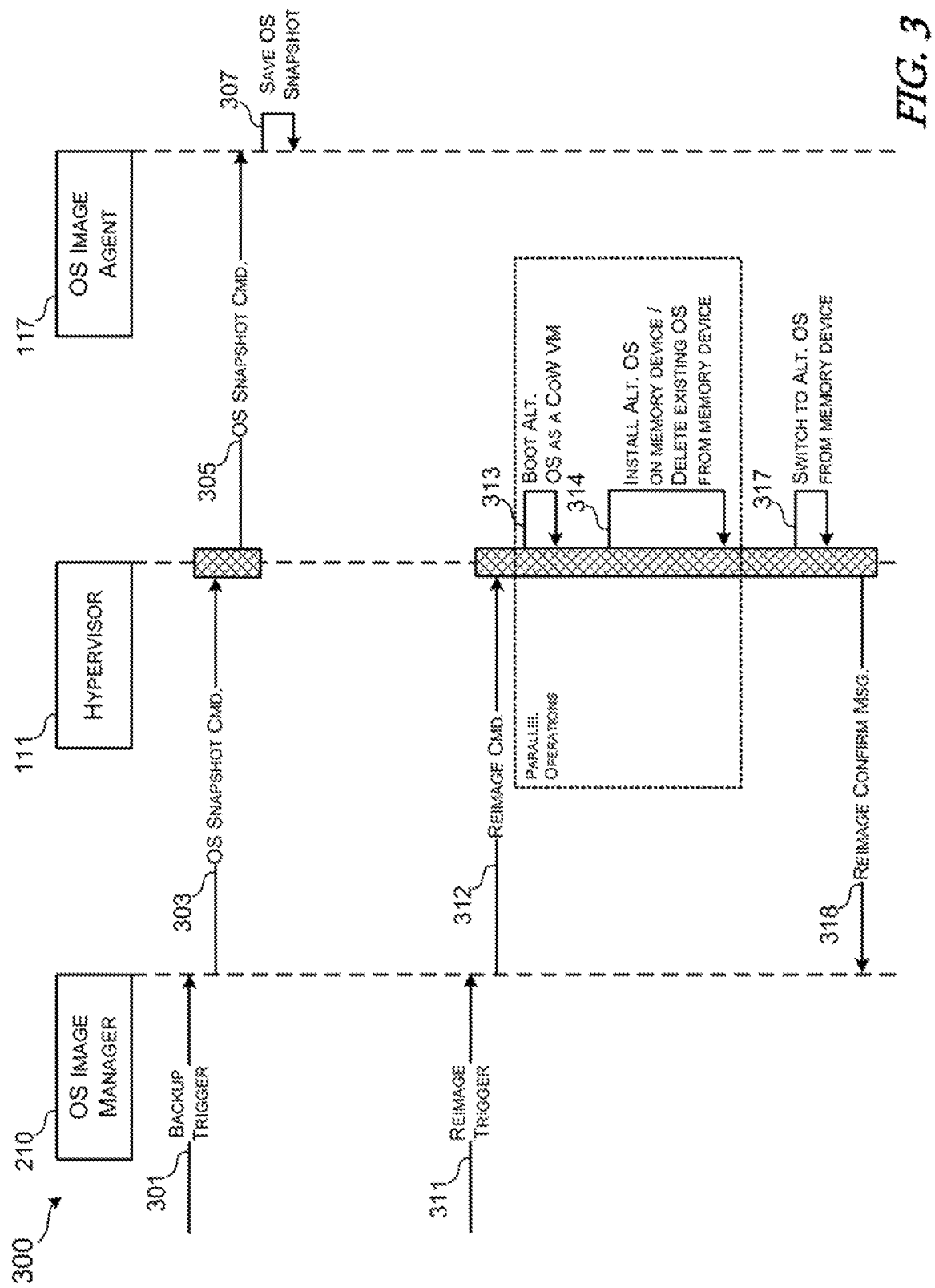
FIG. 3 illustrates an example data flow for managing a switch between domain-specific operating systems.

FIG. 3 depicts an example data flow 300 in example system 200 for managing the transition between operating systems on the computing device 110. The transition between one operating system to another can begin with operating system image manager 210 can receiving a backup trigger signal at reference 301. As depicted in FIG. 2, the operating system image manager 210 can be instantiated on a computer system remote from the computing device 110. For example, the operating system image manager 210 can be hosted on a server computer connected to the trusted network 205. As such, the operating system image manager 210 can be implemented as executable code that include instructions that when executed by a processor cause the processor to have the functionality of the operating system image manager 210 described herein. Accordingly, the backup trigger signal at reference 301 received by the operating system image manager 210 can be initiated by a user.

In some implementations, the user can initiate the backup trigger signal at reference 301 by accessing a website associated with or connected to the operating system image manager 210. In such implementations, the operating system image manager 210 can include functionality for providing the website or other remotely accessible user interface, such as an application or "app" executed on a companion device (e.g., a smartphone companion to a laptop computer).

In other implementations, a user may initiate the backup trigger at reference 301 using functionality of the operating system image agent 117 instantiated on the computing device 110. In such embodiments, the operating system image agent 117 can send the backup trigger message at reference 301 through the trusted network 205.

In various implementations, the operating system image agent 117 and/or the operating system image manager 210 can provide controls for selecting an operating system from multiple operating systems available in the operating system library 2111 to install on the computing device 110. For example, the user may be presented with collection of operating systems and associated data level configurations suitable for use in an untrusted domain 103. The collection of operating systems presented to the user can be based on the user's credentials, job function, clearance level, as well as the computing devices type and capabilities.

In addition, the operating system image agent 117 and/or the operating system image manager 210 can include functionality for initiating and executing a backup of the operating system (e.g., OSx 118) currently running on the computing device 110. Accordingly, in the example implementation depicted in FIG. 3, the operating system image manager 210 can generate and send an operating system snapshot command at reference 303 to the hypervisor 111 instantiated on the computing device 110. In response to the operating system snapshot command at reference 303, the hypervisor 111 can issue an operating system snapshot command at reference 305 to the operating system image agent 117.

In response to the operating system snapshot command at reference 305, the operating system image agent 117 can generate and save an operating system snapshot at reference 307. Generating and saving the operating system snapshot at reference 307 can include generating an image of the current state of the operating system currently running on the computing device 110. The operating system snapshot at reference 307 can also include backup versions of any document level or user level data stored on the computing device 110 at the time of the snapshot. For example, the operating system snapshot at reference 307 can also include backup copies of word-processing documents, spreadsheets, presentation/slideshows, digital images, email, and the like.

Saving the operating system snapshot at reference 307 can include saving a local copy of the image and/or transmitting a copy of the image to the operating system image manager 210 instantiated on a remote server computer. Accordingly, the operating system image manager 210 can save the image of the existing operating system in the operating system library 211 where it can be organized by timestamp or creation date. Each image of an operating system in the operating system library 211 can also be associated with an identifier corresponding to a user and/or computing device 110.

Once the operating system snapshot has been created, the operating system image manager 210 can receive a re-image trigger signal at reference 311. The reimage trigger signal at reference 311 can be generated in response to user input received through the operating system image agent 117 of the computing device 110 or through a website or other control mechanism connected to the operating system image manager 210, as described above for the backup trigger signal at reference 301. Accordingly, the operating system image agent 117 or website associated with the operating system image manager 210 can include functionality for generating the backup trigger signal 301 and/or the reimage trigger signal at reference 311 in response to user input indicating a change in domain 120 or 125.

In response to the reimage trigger signal at reference 311, the operating system image manager 210 can generate and send a reimage command signal at reference 312 to the hypervisor 111. In response to the reimage command at reference 312, the hypervisor 111 can initiate a number of parallel operations.

The hypervisor 111 can boot an alternate operating system as a copy-on-write (CoW) virtual computing system, or virtual machine (VM), instantiated on the computing device 110 at reference 313. For example, the hypervisor 111 can instantiate a CoW VM executing OS2 116 intended to be used in an untrusted domain 103. While the newly instantiated CoW VM is executing the alternate operating system at reference 313, the hypervisor 111 can install the alternate operating system on the memory device at reference 314. Installing the alternation operating can include overwriting the location (e.g., partition) on which the existing operating system is stored. In such implementations, the deletion of the existing operating system is implicit, and as such, residual data associated with the existing operating system may survive the overwriting process (e.g., if the amount of data associated with the alternate operating system is smaller or less than the amount of data associated with the existing operating system). In some other implementations, deletion of the existing operating system at reference 314 can be explicit deletion step or include a reformatting of the associated location in the memory device (e.g., partition). In such implementations, the existing operating system can be deleted before the alternate operating system is installed. The deletion can thus remove the executable code and any data associated with an existing operating system, such as an OS1 114, intended for use in the trusted domain 101. Such implementations are useful in security-critical use cases.

In some implementations the memory device onto which the alternate operating system is installed can be isolated from the memory device on which the existing operating system is installed. For example, the alternate operating system can be installed on a partition of a hard drive (e.g. memory device 115) that is separate from the partition of the hard drive from which the existing operating system is executed (e.g., memory device 113). As such, the installation of the alternate operating system and the explicit deletion of the exiting operating system can be two distinct and possibility concurrent operations. Installing an alternate operating system on a memory device that is isolated from the memory device from which the existing operating system is executed, can prevent cross contamination from possible malware threats.

When the installation of the alternate operating system at reference 314 is complete, the hypervisor 111 can cause the computing device 110 to switch to or resume using the alternate operating system executed from the memory device at reference 317. In some implementations, switching to the alternate operating system at reference 317 can include suspending the instance of the CoW VM executing the alternate operating system. Any changes to data or the alternate operating system caused by the alternate operating system executed in the CoW VM can be merged into the alternate operating system executed from the memory device at reference 317. From a user's perspective, the switch between using the alternate operating system executed as an instance of the CoW VM to the alternate operating system executed from the memory device is seamless. In some implementations, the switch between the instances of the alternate operating system can occur without a rebooting the computer. That is, according to implementations of the present disclosure, the hypervisor 111 can merge any changes made by the CoW VM version of the alternate operating system into the copy of the alternate operating system stored on the memory device without rebooting the computing device.

Because the operations at references 313 and 314 can be performed in parallel, the transition from the existing operating system to the alternate operating system can occur with little to no interruption to the user. With the data flow of the example 300 complete, the computing device 110 is ready for use in the untrusted domain 103. Use of the computing device 103 executing the alternate operating system can result in document level data being stored to a memory device of the computing device 110. Such document level data can be stored on the same memory device in which the alternate operating system is installed.

At reference 318, the hypervisor 111 can generate and send a reimage confirmation message back to the operating system image manager 210 to indicate successful completion of the installation of the alternate operating system.

Figure 4:
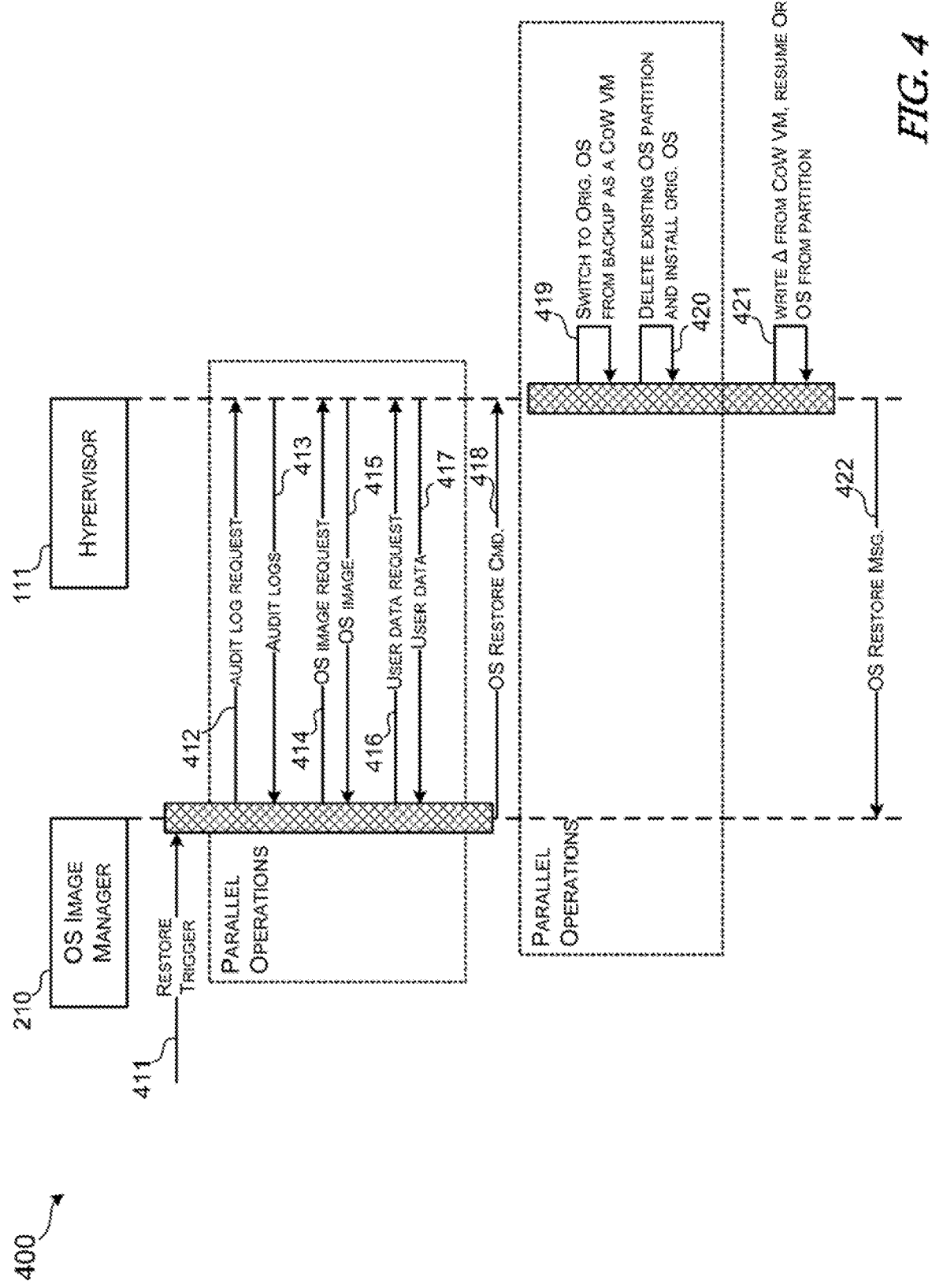
FIG. 4 illustrates an example data flow for managing a restoration of a trusted domain-specific operating system.

Once a user is finished using the computing device 110 in the untrusted domain 103, the user can initiate a transition back to the original operating system used by the computing device 110 prior to the transition to the alternate operating system for use in the untrusted domain 103. FIG. 4 illustrates an example data flow 400 for managing the restoration of an operating system from a backup image of a previously installed operating system. At reference 411, the operating system manager 210 can receive a restore trigger command. Restore trigger command at reference 411 can be initiated in response to user input received by the operating system image agent 117 or a remote computing system. In some implementations, the restore trigger command at reference 411 can be generated in response to user input received through a website associated with the operating system image manager 210.

In response to the restore trigger command at reference 411, the operating system image manager 210 can initiate several parallel operations. For example, the operating system image manager can generate and send a request for audits logs at reference 412 to the hypervisor 111 on the computing device 110. In response to the request for audit logs, the hypervisor 111 can generate and send audit log data back to the operating system image manager 210 at reference 413. The audit logs can include information regarding any changes to firmware or software made a while the computing device was operated in the untrusted domain 103. For example, the audit logs can include BIOS logs of hypervisor secure boot operations or any changes made to the firmware of the computing device 110. The audit logs at reference 413 can be used to analyze any attacks experienced by the computing device 110 while operating in an untrusted domain 103.

At reference 414, the operating system image manager 210 can generate a request to image the operating system currently running on the computing device 110. In response to the request to image the operating system at reference 414, the hypervisor can generate a snapshot or backup image of the operating system at reference 415. The image of the operating system at reference 415 can be transmitted back to the operating system image manager 210. The operating system image manager 210 can quarantine the backup image of the operating system at reference 415 for later analysis.

At reference 416, the operating system image manager 210 can generate and send a request for user data to the hypervisor 111. The request for user data at reference 416 can include an indication of all user level or document level data to be uploaded to the operating system image manager 210 or other quarantine system. For example, the user data request at reference 416 can indicate that all data generated by user while operating a computing device 110 in the untrusted domain 103 be compressed, encrypted, and/or uploaded to the operating system image manager 210. In response to the request for the user data at reference 416, the hypervisor 111 can collect all the requested user level data at reference 417 and transmit it back to the operating system image manager 210.

The operating system image manager 210 can organize the user level data at reference 416 and place it in quarantine. The user level data in quarantine can be scrubbed of potential malware and later restored to the computing device 110.

When the operating system image manager 110 has received the audit logs, the operating system image, and the user data at references 413, 415, and 417, it can generate and transmit and operating system restore command to the hypervisor 111 at reference 418. In response to the operating system restore command at reference 418, the hypervisor 111 can switch to the original operating system (e.g., the operating system used by the computing device 110 prior to the transition to an alternate operating system to be used in an untrusted domain 103) from a backup device as a CoW VM, at reference 419. The term "CoW virtual machine", as used herein, refers to a computing system that uses a policy that requires that whenever changes are made to the shared information, such as the state of an operating system or user level data, that a separate (private) copy of the information be created. In implementations of the present disclosure, any changes made by the CoW virtual machine can thus be recorded and used to update the original operating system or alternate operating system once it is executed or resumed from a memory device in the computing device 110. As such, the switch from the original operating system executed as a CoW VM to the original operating system executed from the memory device can be seamless from the user's perspective because a reboot of the computing device is not necessary.

In implementations of the present disclosure, the hypervisor 111 can retrieve the original operating system from a backup image stored on a memory device local to the computing device 110 or from the remote operating system library 211 coupled to the operating system image manager 210. Accordingly, when the hypervisor 111 boots the original operating system as a CoW virtual machine, it can be coupled to the backup media containing the backup image of the original operating system.

In parallel to booting the original operating system as a CoW virtual machine, the hypervisor 111 can delete the existing operating system (e.g., an alternate operating system intended for use in the untrusted domain) from the computing device 110 at reference 420. In some implementations, deleting the existing operating system can include reformatting a partition or other memory device (e.g., memory device 115) from which the alternate operating system is being executed. Deleting the existing operating system can also include immediately installing the original operating system to a partition or other memory device in the computing device 110.

In some implementations, the original operating system can be installed to the same partition from which the existing operating system was recently deleted. In other implementations, the original operating system can be installed on a separate and/or isolated partition different from the partition from which the existing operating system was previously executed.

At reference 421, the hypervisor 111 can write all the changes made by original operating system while booted as a CoW virtual machine to the copy of the original operating system installed in the computing device 110. The computing device 110 can then be booted using the original operating system from the installation partition or memory device. When the computing device 110 is successfully booted using the installed original operating system at reference 421, it can generate and send an operating system restore confirmation message back to the operating system image manager 210 to indicate completion of the restoration at reference 422.

Figure 5:
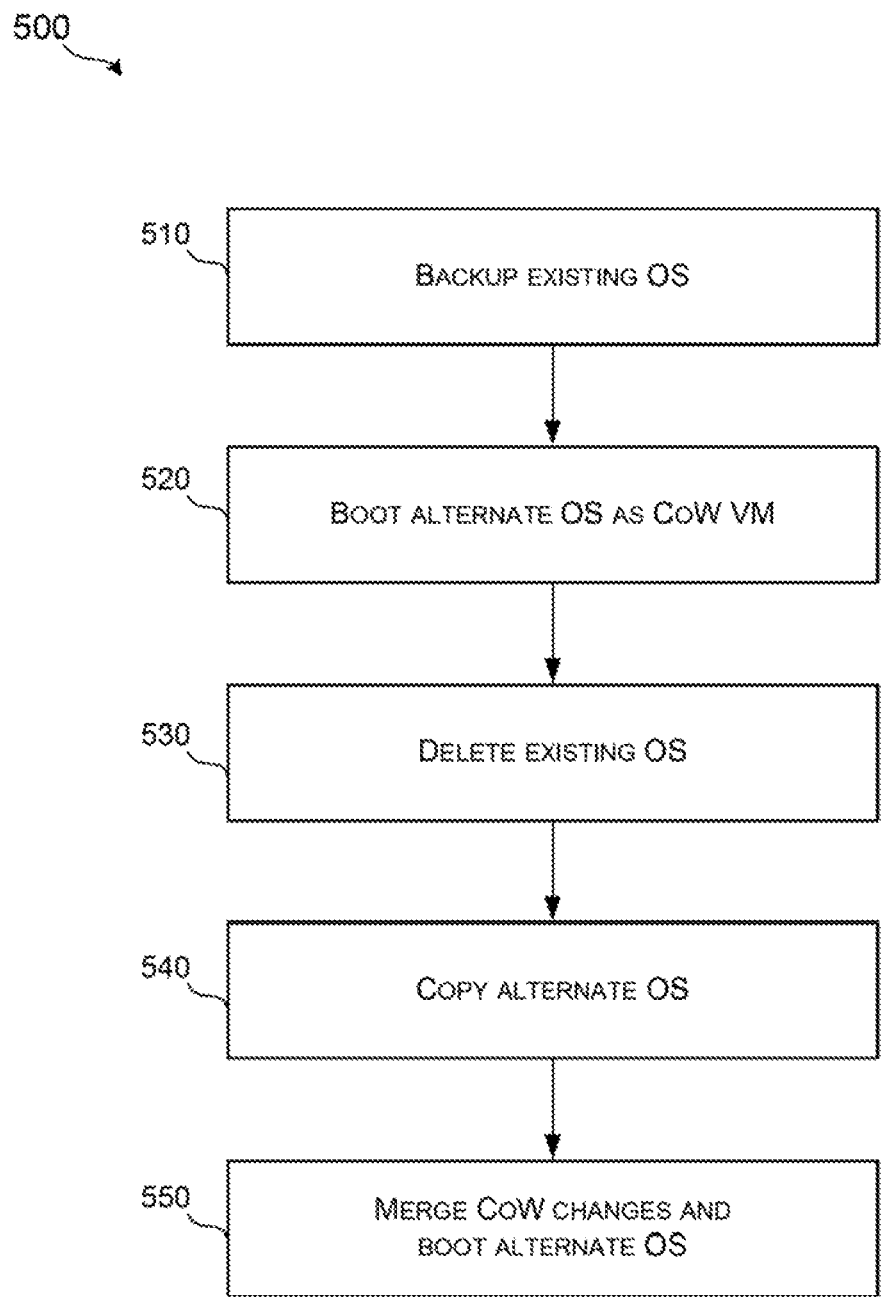
FIG. 5 is a flowchart of an example method for managing a switch between domain-specific operating systems.

FIG. 5 depicts a flowchart of an example method 500 for managing a transition of the operation of a computing device 110 from one operating system to another. As described herein, the transition from one operating system to another can include changing the operating system intended for use in a trusted domain 101 to an operating system intended for use in an untrusted domain 103, and then restoring back to the operating system intended for use in trusted domain 101. Accordingly, the operations described in reference to FIG. 5 can apply to the installation of an alternate operating system to replace an original operating system or restoration of the original operating system to the computing device 110.

As shown, method 500 can begin at box 510 in which the computing device 110 can generate a backup image of the existing operating system. The backup image of the existing operating system can include current operating parameters and associated data stored on the computing device 110. In one example implementation, the computing device 110 can save the backup image of the existing operating system and associated data on a local storage device, such as an optical drive, a USB hard drive, thumb drive, tape drive, or the like. In other implementations, the computing device can save the backup image of the existing operating system and associated data on a remote storage device, such as a server computer on which the operating system image manager 210 is instantiated.

At box 520, the computing device 110 can boot an alternate operating system as a CoW virtual machine. As described herein, the alternate operating system can include operating parameters, such as security protocols, networking capabilities, virus protection functionality, restrictions on user level data and the like. The specific operating parameters and user level data of the alternate operating system can be based on the conditions of a particular domain in which the computing device 110 is anticipated to operate.

At box 530, the computing device 110 can delete the existing operating system from a memory device. In some implementations described herein, deletion of the existing operating system occurs while the computing device 110 is operated by the alternate operating system instantiated on a virtual machine executed on the computing device 110 by the hypervisor 111. Deleting the existing operating system can include also deleting any user level data stored on the computing device 110 associated with the existing operating system.

At box 540, the computing device 110 can copy the alternate operating system to the local memory device or a partition thereon. When the alternate operating system is installed on the local memory device, the computing device 110 can boot the alternate operating system from the local memory device. Any changes that the alternate operating system instantiated as the CoW virtual machine has made, can then be merged into the version of the alternate operating system installed on the local memory device as changes, at box 550. Operation of the computing device 110 can be switched from the CoW virtual machine version of the alternate operating system to the version of the operating system executed from the local memory device with little to no interruption to the user.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing device comprising:
 a processor;
 a memory coupled to the processor; and
 a non-transitory computer readable storage medium coupled to the processor and comprising instructions, that when executed by the processor, cause the processor to:
  change an operating parameter of the computing device based on a domain change, wherein the domain change represents:
   a physical change in location of the computing device from a first geographic location having a first network to a second geographic location having a second network; and a change in a network security level from the first network to the second network;

select, based on the changed operating parameter, a first operating system to be instantiated from a library of operating systems;

instantiate a copy-on-write virtual computing system executing the first operating system based on the domain change;

delete a second operating system from the non-transitory computer readable storage medium or the memory in parallel with the instantiation of the copy-on-write virtual computing system executing the first operating system;

copy the first operating system to the non-transitory computer readable storage medium; and instantiate the first operating system on the computing device.

2. The computing device of claim 1 wherein the instructions that cause the processor to copy the first operating system further cause the processor to receive an image of the first operating system from a remote computing system.

3. The computing device of claim 1 wherein the instructions further cause the processor to write data corresponding to copy-on-write operations performed by the copy-on-write virtual computing system to the non-transitory computer readable storage medium using the first operating system.

4. The computing device of claim 1 wherein the first operating system comprises a first set of operating parameters associated with use of the computing device in a trusted operating environment and the second operating system comprises a set of operating parameter associated with use of the computing device in an untrusted operating environment.

5. The computing device of claim 1 wherein the instructions that cause the processor to delete the second operating system first cause the processor to save a backup image of the second operating system to a backup storage medium different from the non-transitory computer storage medium and the memory.

6. The computing device of claim 5 wherein the instructions further cause the processor to:

receive a command to restore the second operating system from a remote computing system; and in response to the command to restore the second operating system the instructions further cause the processor to:

send to the remote computing system:

security audit logs regarding operation of the first operating system;

send an image of the first operating system as of the time the command to restore the second operating system is received; and send user data generated during the operation of the first operating system for quarantine;

instantiate a restore copy-on-write virtual computing system executing the second operating system from the backup storage medium;

delete the first operating system from the computing device; and instantiate the second operating system on the computing device.

7. The computing device of claim 6, wherein the instructions further cause the processor to write copy-on-write operations performed by the restore copy-on-write virtual computing system to the non-transitory computer readable storage medium.

8. The computing device of claim 1 wherein the instructions that cause the processor to instantiate the copy-on-write virtual computing system further cause the processor to receive a trigger command from a remote computing system to trigger the instantiation of the copy-on-write virtual computing system.

9. The computing device of claim 8 wherein the trigger command from the remote computing system comprises an indication of a change to a domain associated with the first operating system.

10. The computing device of claim 8 wherein the instructions that cause the processor to copy the first operating system further cause the processor to copy the first operating system from a hidden partition to an active partition of the non-transitory computer readable storage medium.

11. A method managing operating systems comprising:

generating, using a processor of a mobile computing device, a backup image of a first operating system associated with a first operating environment in which the mobile computing device was previously used;

changing, using the processor, an operating para meter of the mobile computing device based on a domain change, wherein the domain change represents:

a physical change in location of the mobile computing device from a first geographic location having a first network to a second geographic location having a second network; and a change in a network security level from the first network to the second network;

selecting, using the processor based on the changed operating parameter, a second operating system to be instantiated from a library of operating systems;

instantiating, using the processor and based the domain change, a copy-on-write virtual computing system executing the second operating system associated with a second operating environment in which the mobile computing device is to be used;

deleting, using the processor, the first operating system from a memory associated with the processor in parallel with the instantiation of the copy-on-write virtual computing system executing the second operating system;

copying, using the processor, an image of the second operating system to the memory associated with the processor; and instantiating, using the processor, the second operating system from the image of the second operating system.

12. The method of claim 11, further comprising writing, using the processor, data corresponding to copy-on-write operations performed by the copy-on-write virtual computing system to the memory.

13. The method of claim 11, further comprising:

in response to a command to restore the first operating system:

generating audit logs composing information about operation of the second operating;

generating an image of the second operating system as of the time the command to restore the first operating system is received;

generating a backup of user data generated during the operation of the second operating system for quarantine;

instantiating a restore copy-on-write virtual computing system executing the first operating system from the backup image;

deleting, using the processor, the second operating system from the computing device in parallel with the instantiation of the restore copy-on-write virtual computing system executing the first operating system; and instantiating the first operating system on the computing device.

14. A non-transitory computer readable storage medium comprising instructions stored in a first partition, that when executed by a processor, cause the processor to instantiate a hypervisor to:

initiate a backup process to generate a backup image of a first operating system currently running on a computing device associated with the processor;

change an operating parameter of the computing device based on a domain change, wherein the domain change represents:

a physical change in location of the computing device from a first geographic location having a first network to a second geographic location having a second network; and a change in a network security level from the first network to the second network;

select, based on the changed operating parameter, a second operating system to be instantiated from a library of operating systems;

instantiate a copy-on-write virtual computing system executing the second operating system based on the domain change;

delete the first operating system from a second partition of the non-transitory computer readable storage medium in parallel with the instantiation of the copy-on-write virtual computing system executing the second operating system;

copy the second operating system to the second partition of the non-transitory computer readable storage medium; and instantiate the second operating system on the computing device from the second partition of the non-transitory computer readable storage medium.

15. The non-transitory computer readable storage medium of claim 14, wherein the first and second partitions are isolated from each other.

* * * * *